June 9, 1931. J. E. MARTIN 1,809,132
SIGNAL WINDOW FOR MOTOR VEHICLES
Filed Nov. 19, 1929
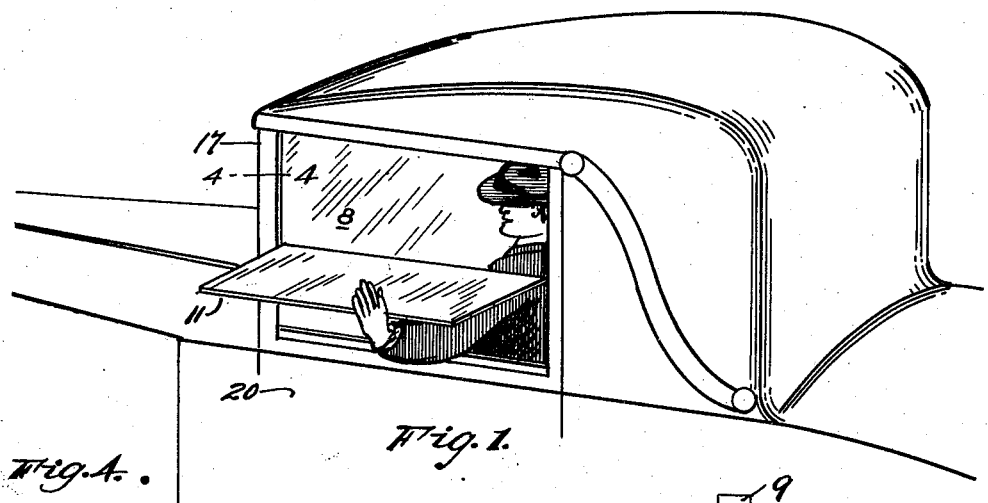
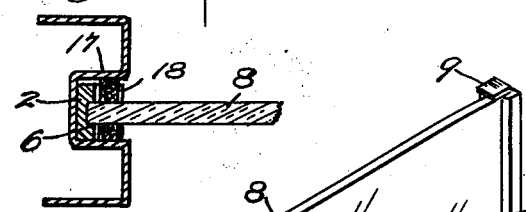
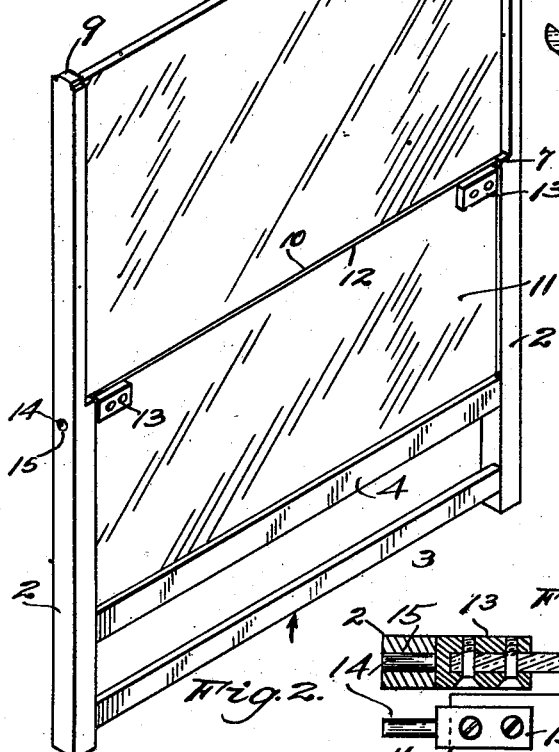
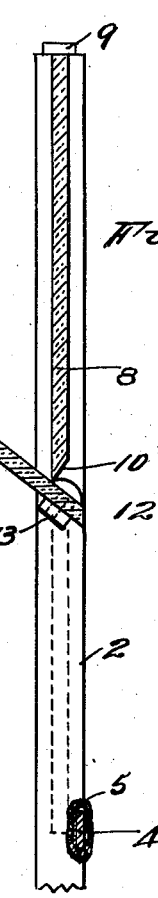
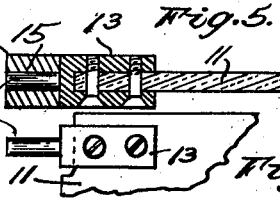
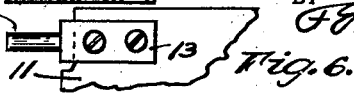
INVENTOR,
James E. Martin;
BY
F. E. Maynard,
ATTORNEY.

Patented June 9, 1931

1,809,132

UNITED STATES PATENT OFFICE

JAMES E. MARTIN, OF PICO, CALIFORNIA, ASSIGNOR OF ONE-HALF TO A. P. SCHRODER AND ONE-HALF TO W. L. ANDERSON, BOTH OF PICO, CALIFORNIA

SIGNAL WINDOW FOR MOTOR VEHICLES

Application filed November 19, 1929. Serial No. 408,270.

This invention relates to motor vehicles and especially to window construction therefor.

It is an object to provide a simple, practicable and low cost signal window for effective use in rainy, storming and cold weather and which includes a transparent window pane so arranged and supported that its lower edge hangs ready for free outward movement by the forearm of the driver of the vehicle.

A further object is to provide a disappearing window-structure for a motor vehicle which can be raised to or lowered from effective position at will and when at such position will afford a good weather protection and yet permit of extension of the driver's arm for conventional signal.

The invention consists in certain advancements in this art as set forth in the ensuing disclosure and having, with the above, additional objects and advantages, and whose construction, combination and details of means, and the manner of operation will be made manifest in the ensuing description of the herewith illustrative apparatus; it being understood that modifications, variations and adaptations may be resorted to within the scope, principle and spirit of the invention as it is more directly claimed hereinafter.

Figure 1 is a perspective of the window as in use.

Figure 2 is a perspective of the glazed sash.

Figure 3 is a vertical section of the panes of the window, the signal pane being forced out as in signal action.

Figure 4 is a cross-section on line 4—4 of Fig. 1.

Figure 5 is a detail section of a trunnion feature, and

Figure 6 is a side elevation thereof.

The sash includes a pair of stiles 2—2 in the form of square metal bars which are parallel and cross-connected by a bottom rail 3 and a bumper rail 4 which is covered with a cushion 5, as of felt.

The upper portions of the stiles are provided with cut-back, channeled faces 6. In these channels is supported, on shoulders 7, an upper transparent pane 8 whose upper corners are overlapped by stop lugs 9.

The lower edge of the pane is beveled downward and outward at 10, Fig. 3, and miters closely with the corresponding top edge 12 of a lower pane 11 which hangs between the stiles 2—2. Secured to the upper corners of the pane 11 are yoke blocks 13 lapping the pane and having coaxial studs 14 which journal in holes 15 through the stiles just below the shoulder 7.

Thus when the sash frame (3—2—2) is placed in suitable jambs 17 the lower pane may be pushed outward by the lower arm of the vehicle driver when making the now generally adopted arm signal for turns and stop intention.

The sash is guided and packed by the usual felt lining 18 secure in the jambs 17.

When the sash is thus installed it may be raised and lowered by the usual or any appropriate mechanisms in the door 20; the mechanisms engaging the lower element, as 3, of the sash.

This signal window, it will be seen, may be easily installed in many standard types of motor vehicles without any material change in the regular construction. It is neat, substantial and effective in the several purposes for which it is designed and costs but little more than a simple, full-size, one-piece sliding window pane.

What is claimed is:

A disappearing sash for a motor vehicle including a frame carrying a divided, transparent window whose lower section is hung by horizontal pivots so that its lower edge may be tilted outward; the sections being co-planar and having mitered meeting edges.

JAMES E. MARTIN.